(12) United States Patent
Fischbacher (10) Patent No.: US 8,235,200 B2
(45) Date of Patent: Aug. 7, 2012

(54) DEVICE FOR GROUPING AND/OR SEPARATING OF ARTICLES

(75) Inventor: Markus Fischbacher, Raubling (DE)

(73) Assignee: Krones AG, Neutraubling (DE)

( * ) Notice: Subject to any disclaimer, the term of this patent is extended or adjusted under 35 U.S.C. 154(b) by 60 days.

(21) Appl. No.: 12/806,573

(22) Filed: Aug. 17, 2010

(65) Prior Publication Data

US 2011/0042184 A1 Feb. 24, 2011

(30) Foreign Application Priority Data

Aug. 18, 2009 (DE) .......................... 10 2009 026 395

(51) Int. Cl.
*B65G 47/29* (2006.01)
(52) U.S. Cl. .................................. 198/419.1; 414/791.7
(58) Field of Classification Search ............... 198/418.7, 198/419.1; 414/791.7
See application file for complete search history.

(56) References Cited

U.S. PATENT DOCUMENTS

| | | | | |
|---|---|---|---|---|
| 2,771,177 | A * | 11/1956 | Cutter et al. ................ | 198/419.1 |
| 3,845,852 | A | 11/1974 | Langen et al. .............. | 198/34 R |
| 3,979,878 | A * | 9/1976 | Berney ............................ | 53/495 |
| 5,070,992 | A * | 12/1991 | Bonkowski ................ | 198/419.1 |
| 5,271,709 | A * | 12/1993 | VanderMeer et al. ...... | 414/791.7 |
| 5,727,365 | A * | 3/1998 | Lashyro et al. .................. | 53/448 |
| 6,182,814 | B1 * | 2/2001 | Koehler ...................... | 198/418.7 |
| 6,253,903 | B1 * | 7/2001 | Takahashi .................. | 198/419.3 |
| 6,360,871 | B1 | 3/2002 | Meyer et al. ................ | 198/419.1 |
| 7,353,933 | B1 * | 4/2008 | Parnell et al. .............. | 198/419.3 |
| 7,726,463 | B2 * | 6/2010 | Aronsson .................... | 198/419.3 |
| 7,726,464 | B2 * | 6/2010 | Cerf ............................ | 198/419.3 |
| 7,815,034 | B2 * | 10/2010 | Fleck et al. .................... | 198/437 |
| 7,857,119 | B2 * | 12/2010 | Petrovic ...................... | 198/419.1 |
| 2008/0099307 | A1 | 5/2008 | Fleck et al. ................ | 198/459.6 |
| 2010/0104681 | A1 | 4/2010 | Dagorn ........................ | 425/170 |

FOREIGN PATENT DOCUMENTS

| | | |
|---|---|---|
| DE | 21 439 10 C2 | 3/1973 |
| DE | 2 540 985 A1 | 3/1977 |
| DE | 2 850 456 A1 | 8/1979 |
| DE | 31 444 49 A1 | 8/1982 |
| DE | 39 385 48 A1 | 5/1991 |
| DE | 41 144 75 A1 | 11/1992 |
| DE | 2 980 7979 U1 | 9/1999 |
| DE | 203 18 583 U1 | 3/2005 |
| DE | 60 300 115 T2 | 2/2006 |
| DE | 10 2004 042 474 A1 | 3/2006 |
| EP | 1 247 769 A1 | 10/2002 |
| GB | 1396763 | 6/1975 |

(Continued)

*Primary Examiner* — Douglas Hess
(74) *Attorney, Agent, or Firm* — Davidson, Davidson & Kappel, LLC (57) ABSTRACT

A device for grouping and/or separating of articles which are transported on a conveyor device (10) along a conveying plane in at least a row in an essentially closed stream and which are grouped by at least one separating finger (16) which is inserted into the stream from below, transverse to the conveying direction (t). The separating finger (16) is inserted in the stream in such a way that a targeted article and the articles following the targeted article are slightly delayed or accelerated during their forward movement in the conveying direction (t) whereby a gap is formed. The separating finger (16) engages with a lateral edge of an outer surface of the article includes a contact area (26) that at least partially contacts and/or at least partially encompasses the outer surface of the article.

8 Claims, 8 Drawing Sheets

FOREIGN PATENT DOCUMENTS

| | | |
|---|---|---|
| GB | 2013599 | 8/1979 |
| GB | 2090804 | 7/1982 |
| JP | 10 181714 | 7/1998 |
| WO | WO 2008/009808 A1 | 1/2008 |

* cited by examiner

DEVICE FOR GROUPING AND/OR SEPARATING OF ARTICLES

This claims the benefit of German Patent Application DE 10 2009 026 395.0, filed Aug. 18, 2009 and hereby incorporated by reference herein.

The invention relates to a device for grouping and/or separating of articles that are transported in rows.

BACKGROUND

Such devices for grouping and/or separating are used in the inlet area of packaging machines that insert beverage containers or bottles into cartons or bottle crates. Quadrangular containers for beverage containers or bottles are usually fed in a closed row without any gaps in between. The plane-parallel side surfaces of the quadrangular containers pointing in the conveying direction and in the direction opposite to the conveying direction contact each other directly. The containers supplied to the packaging machine have to be adjusted to defined distances separately or group wise. This is independent of the working model of the packaging machine, i.e. if the packaging machine works tact wise or continuously.

For this reason separating rollers, plungers or the like are used that are introducible into the conveying system from below in a controlled fashion. The separating rollers, plungers or the like become engaged with the lower part of the container and raise it to a certain level above the conveyor plane. Leading containers are accelerated and/or trailing containers are slowed down by engaging either the backside of the leading container or the front side of the trailing container. In this way a separation or a grouping of the containers is possible by enlarging the distances between them. A gap between the containers is created in an initially continuous row. Further one the separating rollers or plungers will be taken out of the conveying device by a downward movement into a position in which they are not engaged with the containers anymore. These known separation or grouping mechanisms lead to a disturbance in the container inlet and also tend to bring about a significant noise development. Furthermore the containers are subject to great mechanical stress which can lead to unwanted damages.

Devices for separation or grouping of quadrangular packages where the articles are lifted perpendicular to the conveying plane are known from DE 21 43 910 C2, DE 25 40 985 A1, DE 2850456 A1, DE 31 44 449 A1, DE 39 38 548 A1, DE 41 14 475 A1 and DE 10 2004 042 474 A1.

DE 298 07 979 U1 furthermore depicts a device for grouping or separating of articles where the articles are transported in one or more closed rows on a conveyor belt and are pulled apart individually or group wise Hereby two elements can be moved forward and backward parallel to the transport direction independently of each other. These two elements are engaged or disengaged with the articles in a controlled fashion. During a forward movement in transport direction the elements take up a working position whereby the elements interfere with the transport path of the articles. The elements are movable into a ready position by a backward movement in the same transport path against the transport direction, whereby a space between the elements in ready position and the articles is created. If the incoming articles transported in several rows, then two individually movable elements are assigned to each conveying path.

From DE 603 00 115 T2 a device for separating, isolating or grouping of continuously fed products or bottles is known that has a feeding conveyor belt and separating devices for the grouping of the bottles.

EP 1 247 769 A1 describes a further device for grouping bottles or other articles that are transported on a horizontal conveyor belt. Separating fingers are arranged on an endlessly circumferential track that is located below the transport plane. The separating fingers immerse between the bottles from below. Therefore the movement of the bottles compared to the movement of the conveyor belt is slowed down during the horizontal movement of the bottles in transport direction resulting in the formation of gaps. The arrangement or the distance between a plurality of separating fingers determines the required groups of two, three or more bottles that are slowed down compared to the other bottles. The separating fingers are arranged pair wise and each engage with the lower part of the outer surface of the bottles within each transport lane.

By each of the known grouping devices using separating elements or fingers emerging from below a transport lane, the exact positioning of the fingers between the bottles to be separated is very important. Even if the positioning is very exact it often happens that the bottles to be separated are displaced slightly during the engagement with the fingers. This leads to disturbances of the precise processes. But the separating fingers need to have a certain thickness. Otherwise it might happen that some bottles just pass the separating fingers that vertically block the path.

SUMMARY OF THE INVENTION

An object of the present invention is to further specify a device for grouping and/or separating of articles, whereby the reliability of the grouping of the articles is increased and whereby differently shaped and or differently sized articles can be grouped with the same reliability.

The invention comprises a device for grouping and/or separating of articles. The articles are transported on a conveyor device along a conveying plane in at least one row in an essentially closed stream. The articles are grouped by at least one separating finger that is inserted into the article stream from below the transport plane transverse to the conveying direction. The separating finger is inserted in the article stream in a way that a targeted article and articles following the targeted article are slightly delayed or accelerated during their forward movement along the conveying direction whereby a gap is formed between the articles and which leads to a separation of the targeted article group from the remaining article stream. According to the present invention the dividing finger that engages with a lateral edge of an outer surface of the article has a contact surface that at least partially contacts and/or at least partially encompasses the outer surface of the article.

The accuracy and leading qualities of the separating fingers are favorably influenced, if the separating fingers have a triangular cross section extending at least over the length which is in contact with the outer surface of the article. The triangular cross section of the separating finger can either contact the outer surface of the article or a lateral edge of the outer surface of the article. In this case the contact surface of the separating finger is formed by the base area of the triangular cross section.

In a preferred embodiment of the device according to the invention two parallel separating fingers are assigned to each row of articles. The separating fingers are placed at the lateral edge of the row, so that they engage with the article on both sides, whereby the articles glide along laterally placed guide rails that form the lanes. Because the articles are guided on both sides by the separating fingers placed pair wise, the accuracy of the separation or grouping is enhanced. For the required purpose it might suffice to work with single separating fingers placed just on one side of each row of articles.

Preferentially each separating finger comprises a plinth, whereby the separating finger can be fixed to a circumferential carrier that controls the travelling path of the separating finger.

Furthermore at least the edges of the separating finger that are facing the articles can be radiused. When the separating fingers emerge from below the conveying plane or when the separating fingers glide along the outer surface of the articles the radiuses edges of the separating fingers prevent an interlocking with or a scratching of the articles walls. Because the articles transported are preferentially stretch molded PET-beverage containers, the used separating fingers are made of light alloys and the radiused edges are especially important to prevent scuffs on the containers or plastic bottles. Optionally the separating fingers can also be made out of steel, plastic or another suitable material. To give the separating fingers the required surface properties they can be provided with plastic coatings or coverings.

Preferentially the separating fingers are also radiused in the junction to the plinth, therefore not containing any distinct edges in this region.

Optionally the contact area of the separating finger facing the article has a concave cross section, whereby the concave contact area is customized to the outer form of the article and whereby the concave contact area at least partially encompasses the outer surface of the article.

In the present context the word article is to be understood as quadrangular articles of all kinds, especially beverage containers, bottles or the like. The articles are preferentially all the same, with equivalent dimensions and size and can therefore be grouped easily. Quadrangular bottles with radiused edges are particularly suitable because the formed geometries allow an especially exact separation with the device according to the present invention and the separating fingers used therein.

The separating fingers emerging between the articles of a continuous row can show a travelling path that is slowed down at least temporarily compared to the travelling path of the conveyor device. Optionally they can also show an at least temporary accelerated travelling path compared to the travelling path of the conveyor device. In this way it is possible to slow down a pre-grouped group of articles in the transport direction by the means of the separating fingers thereby separating it from a preceding, non delayed pre-grouped group of articles. This allows a reliably grouping of the articles without disturbing the distances between the articles of a group itself.

Because the separating fingers can be delayed temporarily compared to the transport velocity of the conveyor device, the articles will be dammed at the separating fingers. Only after some time, just before the separating fingers submerge, the separating elements are accelerated, whereby the retarding effect for the articles is suspended, and therefore the conveyor device is able to accelerate the articles again. In this way the required distances are generated. The separating device with the separating fingers attached thereto is designed in such a way, that the article with delayed transport velocity compared to the conveyor device is dammed till the separating device is accelerated and submerges. Then the separating device does not engage with the first article of the pre-grouped article group of at least two articles standing together anymore.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

On the basis of the schematic view of FIGS. 1 to 8 the structural design and the fundamental functionality of a device and a method for grouping and/or separating of articles according to the present invention are explained on the example of grouping beverage containers or bottles.

Figure 1:
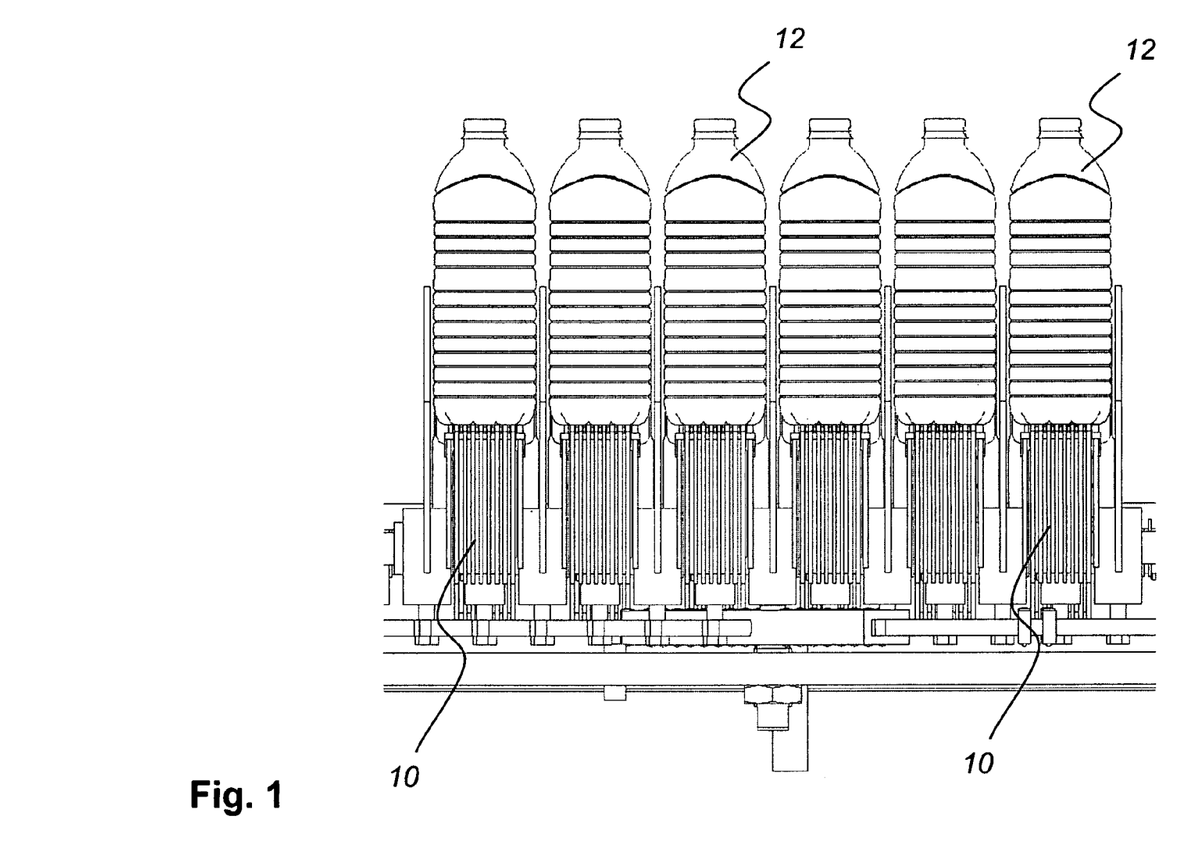
FIG. 1 shows a schematic front view of an embodiment of a conveyor device with a device for grouping and/or separating of bottles.
Figure 2:
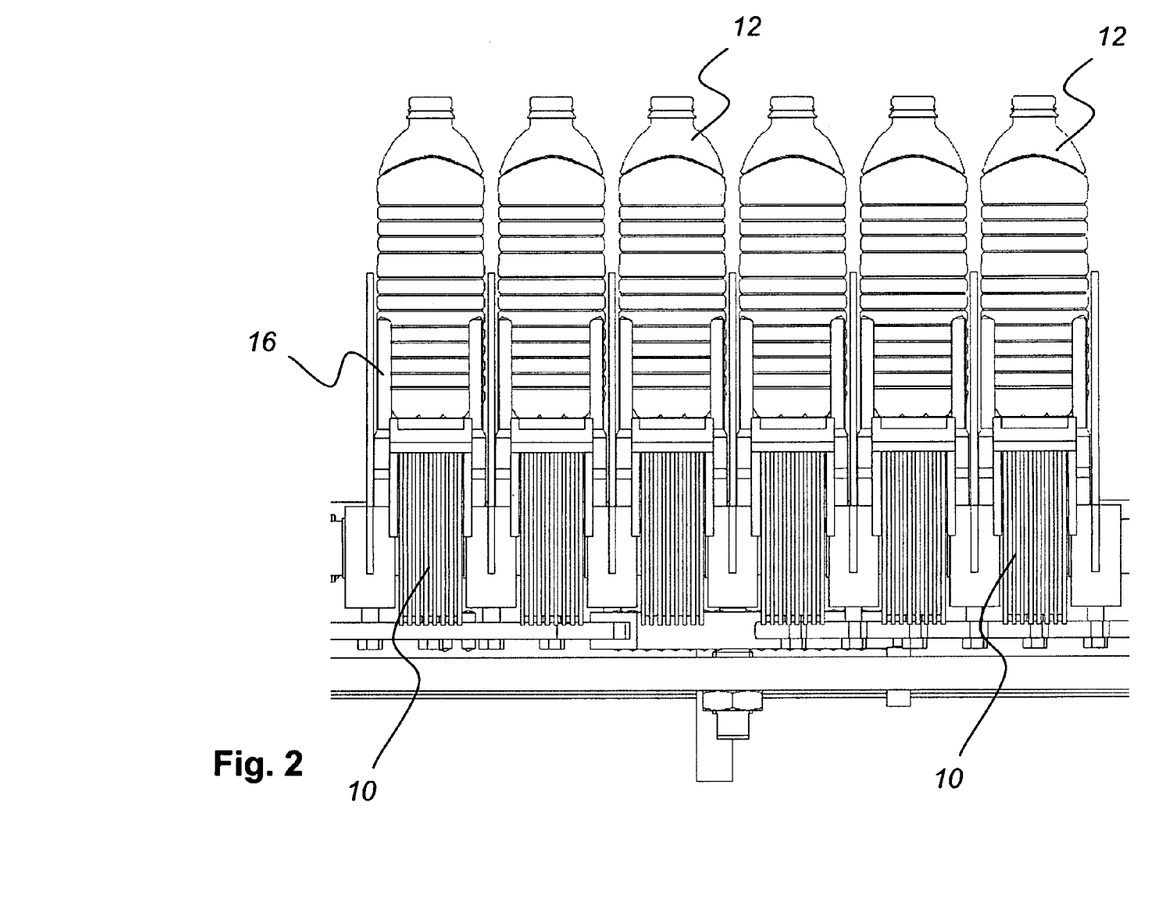
FIG. 2 shows another view of the conveyor device according to FIG. 1 whereby the separating fingers are displaced or tilted upwards and whereby the separating fingers engage with the outer surface of the bottles on both sides.
Figure 3:
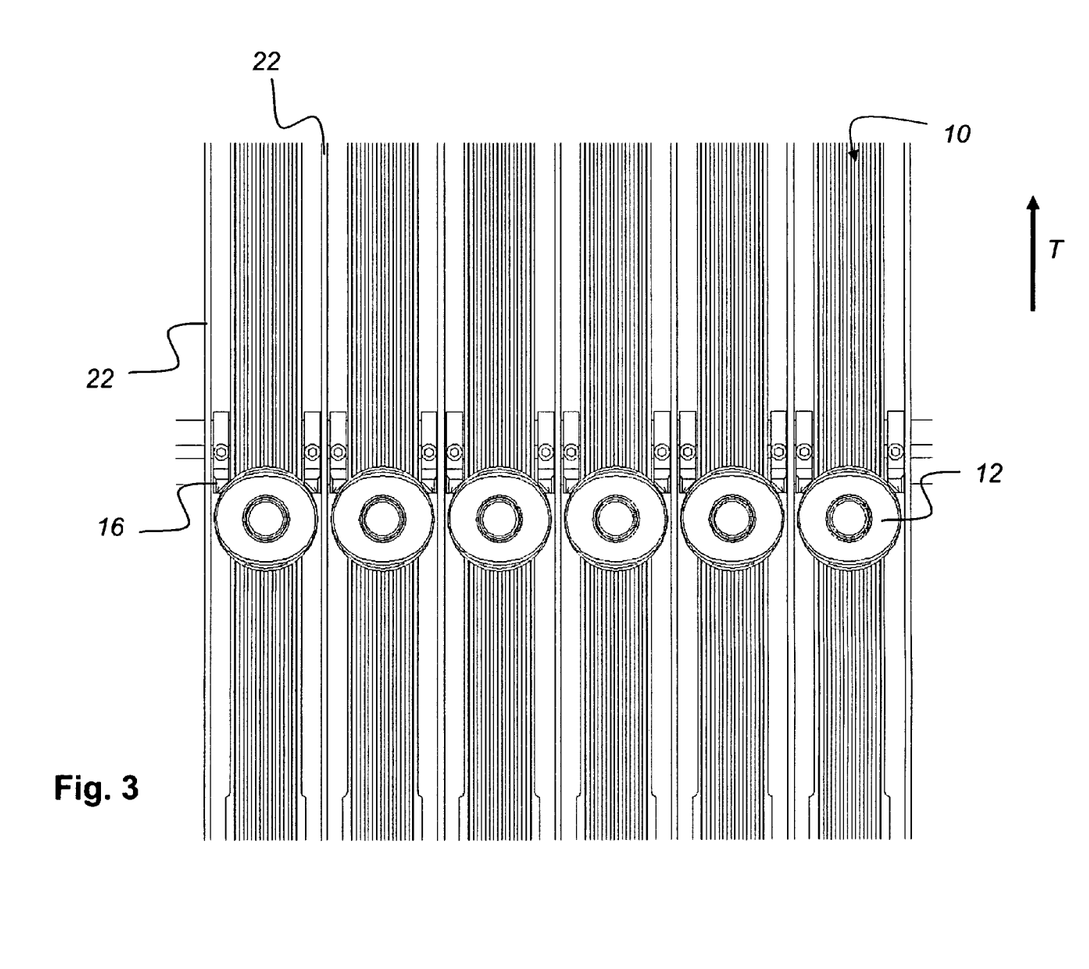
FIG. 3 shows a top view of the conveyor device according to FIG. 2 from above.
Figure 4:
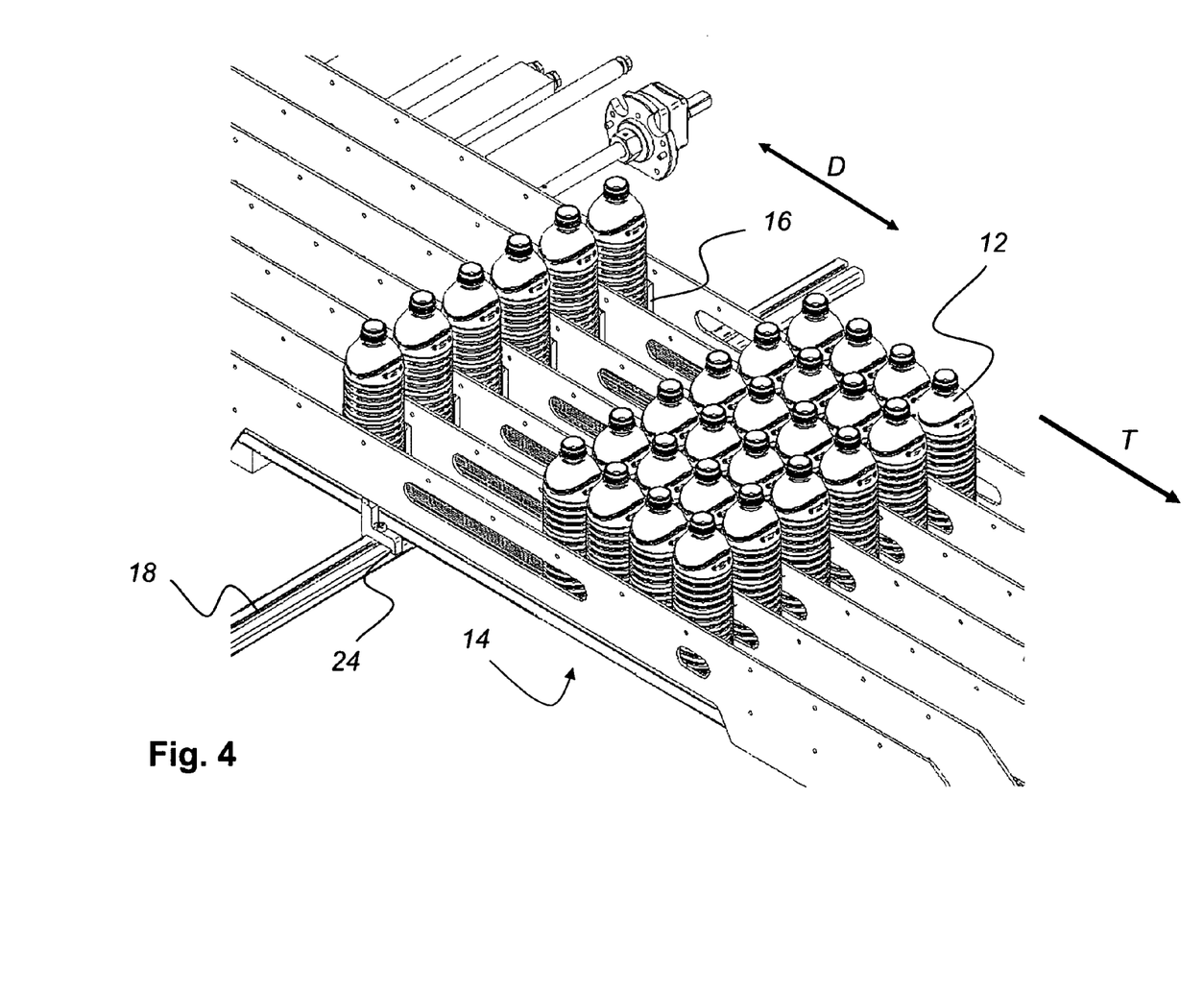
FIG. 4 shows a schematic perspective view of a conveyor device with several rows of grouped bottles.
Figure 5A:
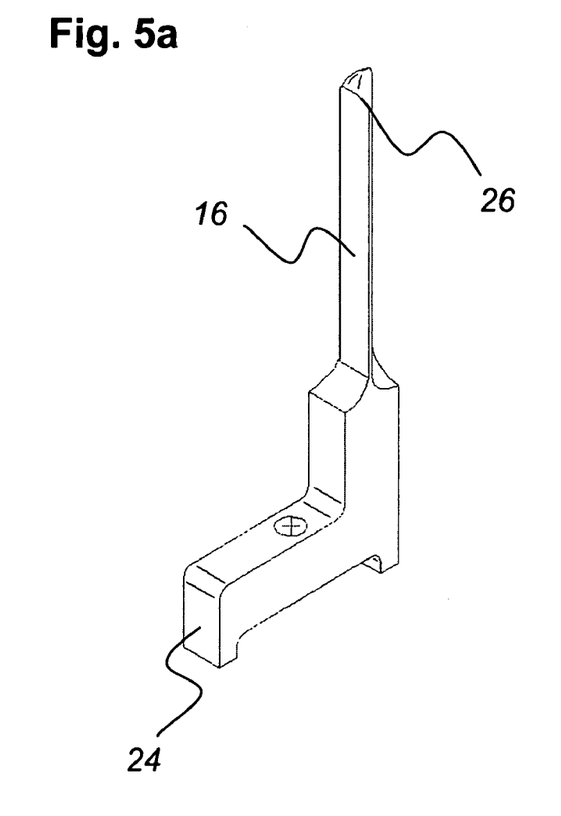
FIG. 5 shows two different views of a first embodiment of a separating finger.
Figure 5B:
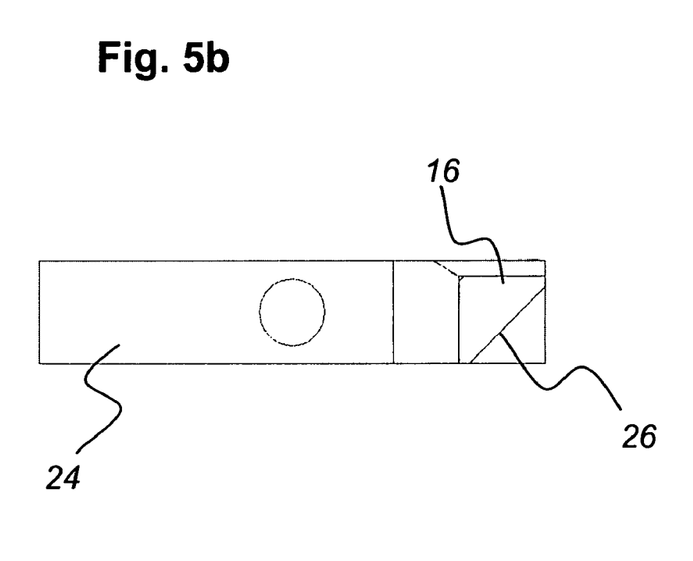
Figure 6A:
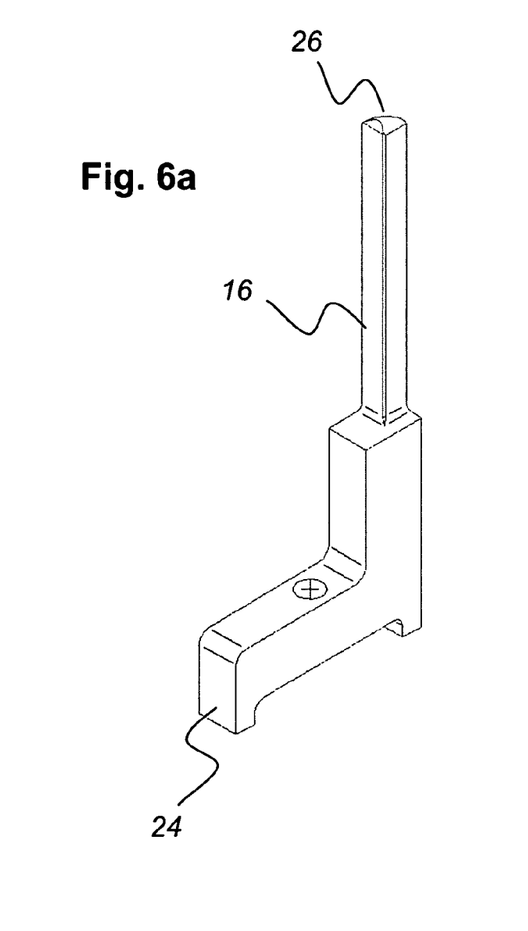
FIG. 6 shows two different views of the first embodiment of the separating finger in a design that is the mirror image of FIG. 5.
Figure 6B:
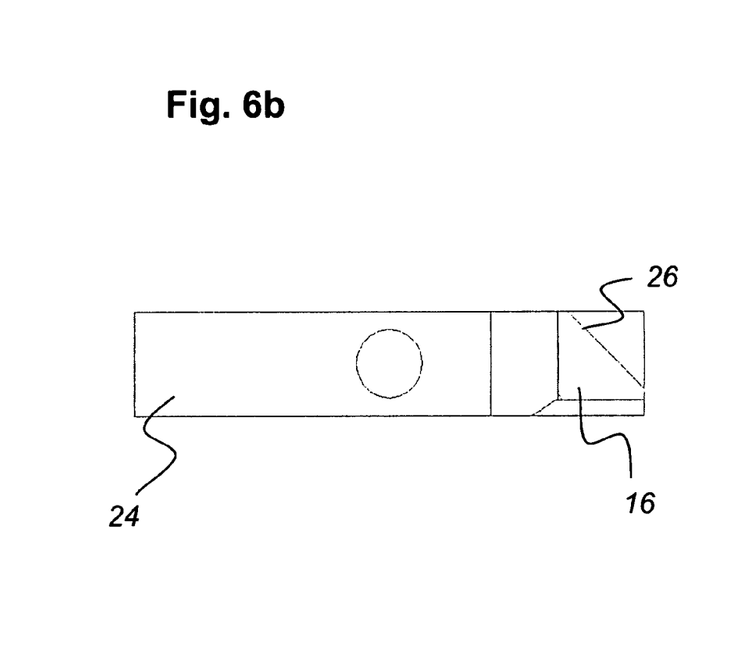

Continuous rows of bottles 12 are delivered on six parallel conveyor belts 10 in transport direction T (see FIGS. 3 and 4). For further processing of the bottles 12 or packaging of the bottles 12 in the packaging station located downstream it might be necessary to group a required number of bottles 12. The bottles 12 that are first transported in rows without any gaps on the conveyor belt 10 are then grouped into groups 14 of two, three or more bottles 12 (see FIG. 4). A group 14 is then distanced from a succeeding group 14 of two, three or more bottles 12 by a defined distance D. The grouping is made with the help of several separating fingers 16, which are inserted between the bottles 12 in regular intervals from below the transport plane whereby groups 14 are formed as shown in FIGS. 2, 3 and 4. In the representation depicted in FIG. 1 the separating fingers 16 are not yet inserted between the bottles 12 shown in the drawing layer. The insertion of the separating fingers 16 occurs when they are pushed up from below.

The surface of the conveyor belt 10 is preferentially organized in a way that the bottles 12 can glide along smoothly and can be delayed by the separating means 16. On the other hand it should be possible to accelerate the bottles 12 without a major delay after the separating means 16 submerge. The bottles 12 should be accelerated to the transport velocity of the conveyor belt 10 almost slip free.

As already indicated in FIG. 4 all parallel separating fingers 16 of the six conveyor belts 10 are each mounted on a common carrier 18, e.g. they are fixed by screw joints. The carrier 18 is moved parallel to the conveyor belt 10 and below its surface with a delayed or variable velocity, whereby the separating fingers 16 are pushed upward at a desired position. After the bottles 12 are grouped, the separating fingers 16 are pulled down again. The separating means emerge from below the conveyor belt 10 almost perpendicular to the transport direction T above its surface level and between the individual bottles 12, whereby the groups 14 are not displaced significantly. This perpendicular emerging from below can be guaranteed by a suitable articulated bearing of the separating means 16 on a continuously rotating pulling means and the carrier 18 transported therewith and an additional suitable guidance of the separation fingers 16. The additional suitable guidance is required for the desired shifting of the separating fingers 16 during their movement as well as for the desired acceleration of the separation fingers 16 shortly before they submerge. The velocity of the continuously rotating pulling means and the carriers 18 moved therewith is to be coordinated with the transport velocity of the conveyor belt 10, so that the desired grouping of the bottles 12 takes place.

As already indicated in FIG. 3, two separating fingers 16 are assigned to each bottle and both separating fingers 16 engage with their assigned bottle 12 at the same time. The two separating fingers 16 assigned to each bottle 12 are placed at the lateral edge of each corresponding transport lane 20, so that they engage on both sides of the bottle 12, whereby the bottles 12 glide along laterally placed guide rails 22 that form and confine the transport lanes 20. Because the bottles 12 are guided on both sides by separating fingers placed pair wise, the accuracy of the separation or grouping is enhanced.

As shown clearly in FIGS. 4 to 8 each separating finger 16 has a plinth 24 with which it can be fixed to the circumferential carrier 18 that controls the movement path of the separating finger 16. Furthermore the separating fingers are radiused at the edges facing the bottles 12. Therefore, when the emerging from below the conveying plane or when gliding along the outer surface of the bottles 12 the radiused edges of the separating fingers prevent an interlocking with or a scratching of the bottle walls. As the bottles 12 preferentially are stretch molded PET-beverage containers, radiused edges on the separating fingers 16 which are usually made of light alloy are especially important to prevent scuffs on the plastic bottles. Optionally the separating fingers 16 can also be made out of steel, plastic or another suitable material. To give the separating fingers the required surface properties they can also be provided with plastic coatings or coverings.

As can be seen in the different embodiments shown in FIGS. 5 to 8 each separating finger 16 is radiused in the junction to the plinth, therefore not containing any distinct edges in this region.

FIGS. 5a, 5b, 6a and 6b show a first embodiment of a separating finger 16 with a triangular cross section, whereby the contact area 26, that contacts the outer surface of the bottles 12 is even. The separating finger 16 shown in FIGS. 5 and 6 are mirror images of each other, thereby forming a pair that is assigned within a transport lane 20 for the guidance of one bottle 12.

Figure 7A:
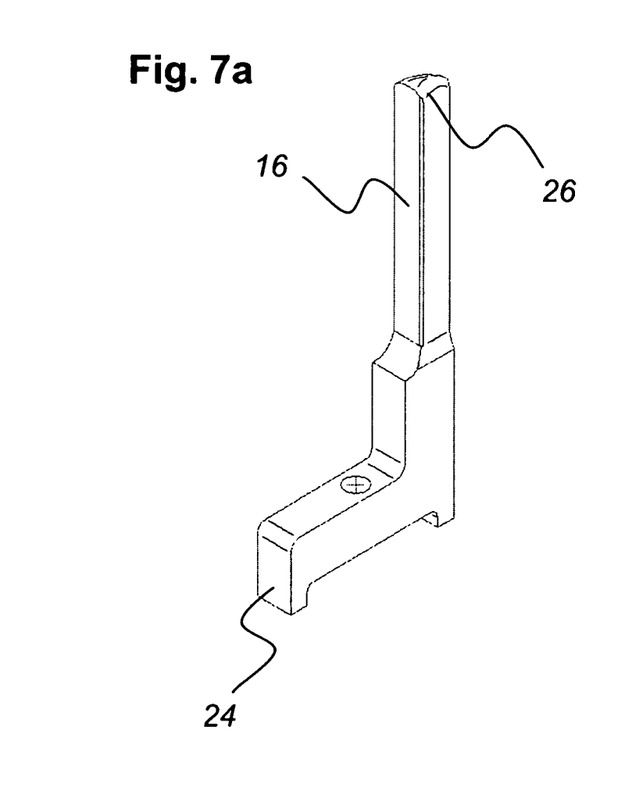
FIG. 7 shows two different views of a second embodiment of a separating finger.
Figure 7B:
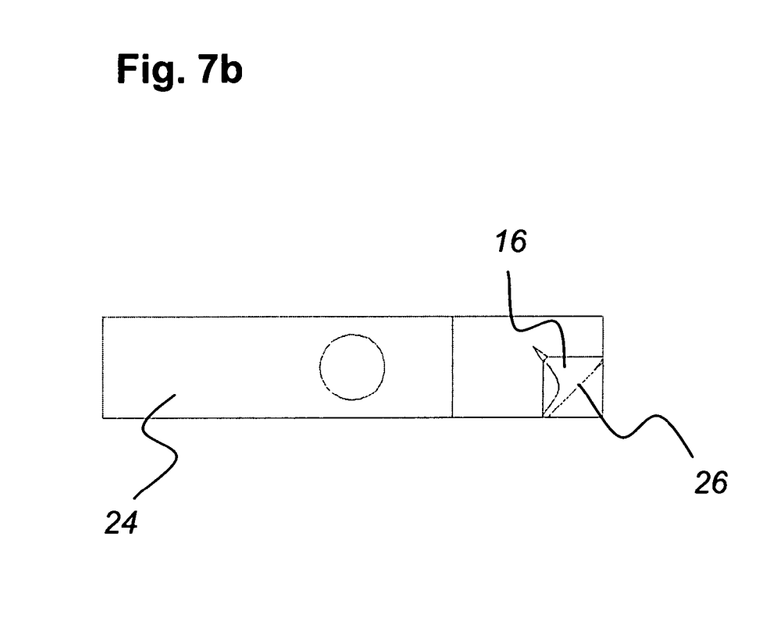
Figure 8A:
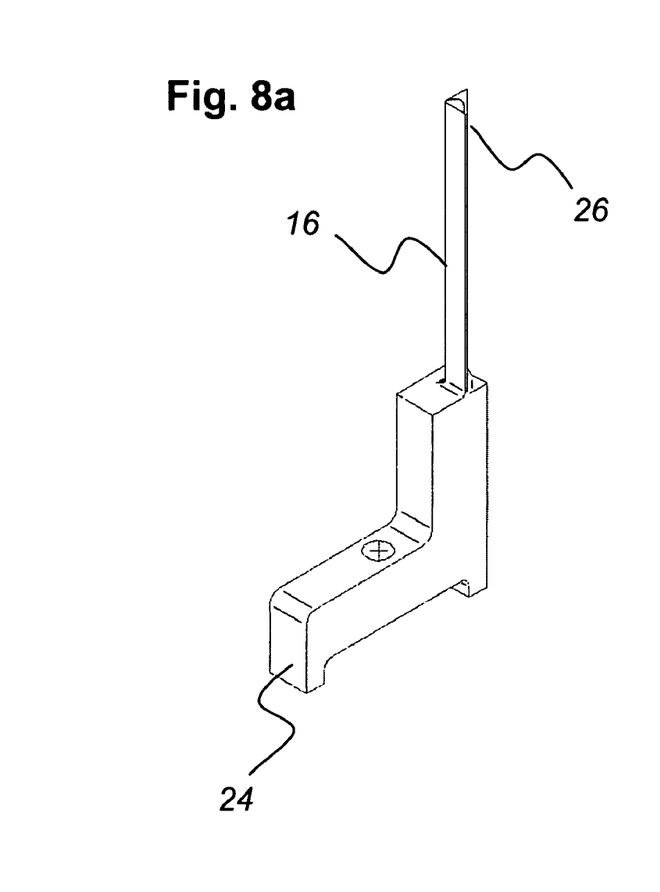
FIG. 8 shows two different views of the second embodiment of the separating finger in a design that is the mirror image of FIG. 7.
Figure 8B:
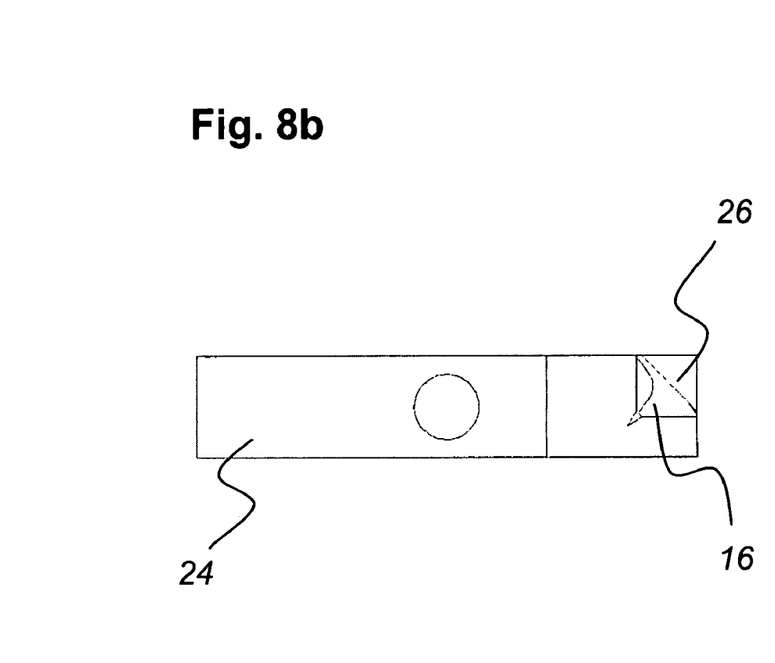

Optionally the contact area 26 of the separating finger 16, which faces the outer surface of the bottles 12 can have a concave cross section as shown in FIGS. 7 and 8, whereby the concave contact area 26 is customized to the outer form of the bottle 12 and whereby the concave contact area 26 encompasses the outer surface of the article at least partially.

A main advantage of the described grouping with the help of at least two separating fingers 16 is that the bottles 12 of a group 14 do not disengage from each other because there are held together without any distance by the two bounding separating fingers 16. Preferably the bottles 12 of a group 14 are slowed down by the separating fingers 16 that are moving more slowly than the conveyor belt 10. Thereby the bottles 12 are pushed together permanently.

The invention has been described with reference to preferred embodiments. To the expert it is also conceivable, however, to make changes and modifications without leaving the scope of protection of the appended claims.

LIST OF REFERENCE SYMBOLS 10 conveyor belt
12 bottle
14 group
16 separating finger/separating means
18 carrier
20 transport lane
22 guide rail
24 plinth
T transport direction

What is claimed is:

1. A device for grouping and/or separating of articles transported on a conveyor device along a conveying plane in at least a row in an essentially closed stream comprising:
at least one separating finger grouping the articles and being inserted into the stream from below, transverse to the conveying direction, the at least one separating finger including at least two separating fingers mounted parallel to each other on a common carrier and being inserted in the stream in such a way that a targeted article and the articles following the targeted article are slightly delayed or accelerated during their forward movement in the conveying direction to form a gap,
the separating fingers having an even contact surface contacting the outer surface of the article and each row of articles being assigned two parallel separating fingers, each assigned to a lateral edge of the row, so that the two fingers contact both sides of the article, and
guide rails laterally placed with respect to the articles to form the row, the articles gliding along the guide rails.

2. The device as recited in claim 1 wherein the separating finger has a triangular cross section extending at least over a length where said separating finger is in contact with the outer surface of the article.

3. The device as recited in claim 1 wherein a surface area of the triangular cross section of the separating finger is in contact with the outer surface of the article or with a lateral edge of the outer surface of the article.

4. The device as recited in claim 3 wherein the contact area of the separating finger is formed by a base area.

5. The device as recited in claim 1 wherein each separating finger includes a plinth, the separating finger being fixable via the plinth onto a circumferential carrier which controls the travelling path of the separating fingers.

6. The device as recited in claim 5 wherein the separating finger is radiused in a junction to the plinth.

7. The device as recited in claim 1 wherein the common carrier moves with a delayed or variable velocity with respect to the conveying device.

8. The device as recited in claim 1 wherein the common carrier moves parallel to the conveying device.

* * * * *